G. A. BARNES.
PIPE CUTTER.
APPLICATION FILED FEB. 10, 1909.
963,729.
Patented July 5, 1910.
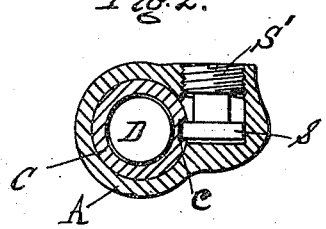
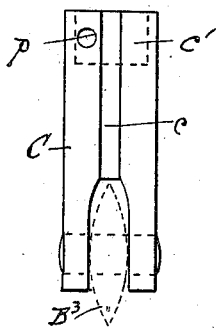
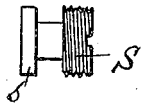
WITNESSES
L. H. Grote
N. E. Keir
INVENTOR
George A. Barnes
BY
Howson and Howson
ATTORNEYS

UNITED STATES PATENT OFFICE.

GEORGE A. BARNES, OF NEW HAVEN, CONNECTICUT.

PIPE-CUTTER.

963,729. Specification of Letters Patent. Patented July 5, 1910.

Application filed February 10, 1909. Serial No. 477,068.

*To all whom it may concern:*

Be it known that I, GEORGE A. BARNES, a citizen of the United States of America, and residing at New Haven, in the county of New Haven and State of Connecticut, have invented a certain new and useful Improvement in Pipe-Cutters, of which the following is a specification.

My invention relates to pipe cutters and the particular object of my invention is to provide an improved device of this type in the particulars set forth hereinafter.

In the accompanying drawing in which a pipe cutter involving my invention is illustrated, Figure 1 is a broken side elevation of the cutter; Fig. 2 a cross section on the line 2—2, Fig. 1; Fig. 3 is an elevation of the block carrying the adjustable cutter blade; and Fig. 4 is a side elevation of the guide screw.

In its main features the present cutter is of common construction having a cast head A carrying cutting blades $B'$, $B^2$, $B^3$, the last mentioned being mounted in a cylindrical block C which slides in a hole drilled through the neck $a$. The handle D is secured to this block in any suitable manner, for instance by means of a pin $p$ engaging behind the head $d$ and entering holes drilled through the block C into the recess $c^1$ formed in the inner end thereof. This arrangement permits the handle to swivel with relation to the block C while still engaging the same and imparting to the latter a backward and forward movement to adjust the depth of the cut. For this purpose a portion $d^1$ of the handle is threaded and engages a corresponding thread in the nut E screwed into the neck $a$.

Difficulty is frequently experienced in securing the proper alinement of the cutting blade $B^3$ with the fixed blades $B^1$ and $B^2$. To overcome this difficulty I propose to provide the block C with a groove $c$ and open into the slide-way for the block a threaded hole to receive the screw S, the shoulder $s$ on which engages in the groove $c$ when the block is in position and the cutters are in substantial alinement. If the cutters happen to be out of alinement, a slight turn of the screw S imparts a rotary movement to the block C and thus at once trues the blade $B^3$ with relation to blades $B^1$, $B^2$. The advantage of this ready adjusting means is of considerable practical advantage since it not infrequently happens in cutters of the common type that the head A has to be twisted to bring the cutter $B^3$ into alinement with $B^1$ and $B^2$ and this is a delicate operation difficult to accomplish with cast metal heads.

It is obvious that the invention does not reside in the precise structure shown and described and I do not limit myself to the details shown.

I claim as my invention:

1. A pipe cutter having a fixed blade and a movable blade, in combination with a carrier for the latter and means for imparting angular movement thereto so as to aline said movable and fixed blades, substantially as described.

2. A pipe cutter having a fixed blade and a movable blade, in combination with a slotted carrier for the latter and a screw with a shoulder engaging in the slot of said carrier whereby the latter may be given an angular movement to bring the movable blade into alinement with the fixed blade, substantially as described.

3. A pipe cutter having a head, a fixed blade mounted therein, a carrier having a bearing in said head and a blade mounted on said carrier, in combination with means for moving said carrier toward and from said fixed blade and means for imparting an angular movement to said carrier whereby the blade mounted therein may be brought into alinement with said fixed blade, substantially as described.

4. A pipe cutter having a casting and a fixed blade mounted therein, together with a movable blade and a carrier therefor passing through and having a bearing in said casting and means for angularly adjusting said carrier so as to aline said movable and fixed blade, substantially as described.

5. A pipe cutter having a fixed blade and a movable blade, in combination with an angularly displaceable carrier for the latter and an adjusting member tangentially engaging said carrier whereby angular movement may be imparted to the latter to bring the movable blade into alinement with the fixed blade, substantially as described.

In testimony whereof I have signed my name to this specification, in the presence of two subscribing witnesses.

GEORGE A. BARNES.

Witnesses:
 JOHN R. JARVIS,
 HAROLD FISH.